(12) United States Patent
Kakuta et al.

(10) Patent No.: US 8,103,757 B2
(45) Date of Patent: Jan. 24, 2012

(54) STATUS MANAGEMENT DEVICE AND STATUS MANAGEMENT METHOD

(75) Inventors: Jun Kakuta, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 715 days.

(21) Appl. No.: 11/932,363

(22) Filed: Oct. 31, 2007

(65) Prior Publication Data

US 2008/0126360 A1    May 29, 2008

(30) Foreign Application Priority Data

Nov. 29, 2006 (JP) .................................. 2006-321283

(51) Int. Cl.
 *G06F 17/30* (2006.01)
 *G06F 15/177* (2006.01)
 *G06F 15/16* (2006.01)

(52) U.S. Cl. ........ 709/223; 709/206; 709/220; 709/227; 707/622

(58) Field of Classification Search ........... 709/223–226
See application file for complete search history.

(56) References Cited

U.S. PATENT DOCUMENTS

| | | | | |
|---|---|---|---|---|
| 2002/0049751 A1* | 4/2002 | Chen et al. | ........................ | 707/3 |
| 2003/0229687 A1* | 12/2003 | Ohno et al. | .................... | 709/220 |
| 2003/0233537 A1* | 12/2003 | Wohlgemuth et al. | ........ | 713/151 |
| 2004/0044738 A1* | 3/2004 | Ohno et al. | ...................... | 709/206 |
| 2005/0021750 A1* | 1/2005 | Abrams | ........................ | 709/225 |
| 2005/0216848 A1* | 9/2005 | Thompson et al. | ........... | 715/753 |
| 2008/0162510 A1* | 7/2008 | Baio et al. | ....................... | 707/100 |

FOREIGN PATENT DOCUMENTS

| | | | |
|---|---|---|---|
| JP | 2003296259 A | 10/2003 |
| JP | 2003316707 A | 11/2003 |
| JP | 200413824 A | 1/2004 |
| JP | 2005157603 A | 6/2005 |
| JP | 2005309500 A | 11/2005 |

* cited by examiner

*Primary Examiner* — Ian N Moore
*Assistant Examiner* — Thai Nguyen
(74) *Attorney, Agent, or Firm* — Westerman, Hattori, Daniels & Adrian, LLP

(57) ABSTRACT

An object of the present invention is to manage presence update by publishers that a presentity does not recognize. When the presence server 100 receives status information that indicates a status of presentity A from publisher B (#1), the presence server 100 stores it in the history table 9 and transmits a change notification to a watcher C (#3). Subsequently, the presence server 100 makes an inquiry to presentity A as to whether or not to allow an update by publisher B (#4). When it is allowed (#5, #6), publisher B is added in the allow list 8a of the allow list DB 8 (#7). Also, presence information is generated based on status information retrieved from the history table 9 (#8), is notified to the watcher C and is stored in the presence management DB 2b (#9, #10). When it is denied (#11), publisher B is added in the deny list 8b of the allow list DB 8 (#12). Also, status information received from publisher B is deleted from the history table 9.

9 Claims, 23 Drawing Sheets

Buddy list

| Watcher ID | Buddy ID | Indication name |
|---|---|---|
| User1 | User2 | Ichiro Tanaka |
| | User3 | Kanako Sato |
| | User9 | Hideki Yamamoto |
| | User10 | Hideki Miyamoto |
| | User11 | Kazuyuki Kato |
| | User12 | Ryoko Okamoto |
| User2 | User1 | Ryosuke Fujiwara |
| | User9 | Hideki Yamamoto |
| | User12 | Ryoko Okamoto |

Presence management table

| Presentity ID | Presence information | Watcher ID | Status |
|---|---|---|---|
| User1 | Headquarters 8F Meeting room A (8/18 9:55) | User2 | allow |
| | | User3 | allow |
| | | User12 | allow |
| User2 | Headquarters 8F Meeting room A (8/18 10:15) | User1 | allow |
| | | User9 | deny |
| | | User12 | asking |
| User3 | Headquarters 6F A Division (8/18 10:05) | User1 | allow |
| | | User6 | deny |

Allow list (initial state)

| Presentity ID | Allowed publisher ID | Allowed time period |
|---|---|---|
| User1 | Sensor3 | * |
|  | Sensor7 | 09:00- 17:30 |
| User2 | Sensor3 | * |
|  | Sensor6 | * |
| User3 | Sensor3 | * |
| User4 | Sensor5 | 08:30- 17:30 |

Allow list (after update)

| Presentity ID | Allowed publisher ID | Allowed time period |
|---|---|---|
| User1 | Sensor3 | * |
|  | Sensor7 | 09:00- 17:30 |
| User2 | Sensor3 | * |
|  | Sensor6 | * |
|  | Sensor4 | * |
| User3 | Sensor3 | * |
| User4 | Sensor5 | 08:30- 17:30 |

Deny list (initial state)

| Presentity ID | Denied publisher ID | Denied time period |
|---|---|---|
| User1 | Sensor1 | * |
|  | Sensor5 | 17:30- 09:00 |
| User2 | Sensor1 | * |
|  | Sensor2 | * |
| User3 | Sensor6 | * |
| User4 | Sensor3 | 17:30- 09:00 |

Deny list (after update)

| Presentity ID | Denied publisher ID | Denied time period |
|---|---|---|
| User1 | Sensor1 | * |
|  | Sensor5 | 17:30- 09:00 |
| User2 | Sensor1 | * |
|  | Sensor2 | * |
|  | Sensor4 | * |
| User3 | Sensor6 | * |
| User4 | Sensor3 | 17:30- 09:00 |

History table (initial state)

| Presentity ID | Operation ID | Publisher ID | Inquiry needed | Allow update | Status information | Status | Previous update |
|---|---|---|---|---|---|---|---|
| User2 | 6 | Sensor1 | Yes | Yes | <place>Headquarters</place><floor>8F</floor><area>Meeting room A</area> | Setting | — |
| User3 | 3 | Sensor6 | Yes | Yes | <place>Headquarters</place><floor>6F</floor><area>A Division</area> | Setting | — |

History table after configuration information is registered

| Presentity ID | Operation ID | Publisher ID | Inquiry needed | Allow update | Status information | Status | Previous update |
|---|---|---|---|---|---|---|---|
| User2 | 6 | Sensor1 | Yes | Yes | \<place\>Headquarters\</place\>\<floor\>8F\</floor\>\<area\>Meeting room A\</area\> | Setting | — |
|  | 7 | Sensor4 | No | No | \<place\>Headquarters\</place\>\<floor\>8F\</floor\>\<area\>In front of EH\</area\> | Keeping | — |
| User3 | 3 | Sensor6 | Yes | Yes | \<place\>Headquarters\</place\>\<floor\>6F\</floor\>\<area\>A Division\</area\> | Setting | — |

History table when temporary update is possible

| Presentity ID | Operation ID | Publisher ID | Inquiry needed | Allow update | Status information | Status | Previous update |
|---|---|---|---|---|---|---|---|
| User2 | 6 | Sensor1 | Yes | Yes | <place>Headquarters</place><floor>8F</floor><area>Meeting room A</area> | Keeping | Yes |
| | 7 | Sensor4 | Yes | No | <place>Headquarters</place><floor>8F</floor><area>In front of EH</area> | Setting | — |
| User3 | 3 | Sensor6 | Yes | Yes | <place>Headquarters</place><floor>6F</floor><area>A Division</area> | Setting | — |

History table after publisher is allowed

| Presentity ID | Operation ID | Publisher ID | Inquiry needed | Allow update | Status information | Status | Previous update |
|---|---|---|---|---|---|---|---|
| User2 | 7 | Sensor4 | Yes | Yes | \<place\>Headquarters\</place\>\<floor\>8F\</floor\>\<area\>Meeting room A\</area\> | Setting | — |
| User3 | 3 | Sensor6 | Yes | Yes | \<place\>Headquarters\</place\>\<floor\>6F\</floor\>\<area\>A Division\</area\> | Setting | — |

*Fig. 7D*

History table after publisher is denied

| Presentity ID | Operation ID | Publisher ID | Inquiry needed | Allow update | Status information | Status | Previous update |
|---|---|---|---|---|---|---|---|
| User2 | 6 | Sensor1 | Yes | Yes | \<place\>Headquarters\</place\>\<floor\>8F\</floor\>\<area\>Meeting room A\</area\> | Setting | — |
| User3 | 3 | Sensor6 | Yes | Yes | \<place\>Headquarters\</place\>\<floor\>6F\</floor\>\<area\>A Division\</area\> | Setting | — |

*Fig. 7E*

| Presentity ID | The number of times before a collective notification is made |
|---|---|
| User1 | Default |
| User2 | 5 |
| User3 | — |
| User4 | 3 |

History table (initial state)

| Presentity ID | Operation ID | Publisher ID | Inquiry needed | Inquiry completed | Allow update | Status information | Status | Previous update |
|---|---|---|---|---|---|---|---|---|
| User2 | 6 | Sensor1 | Yes | Yes | Yes | \<place>Headquarters\</place>\<floor>8F\</floor>\<area>Meeting room A\</area> | Setting | — |

*Fig. 13A*

History table after configuration information is registered (1)

| Presentity ID | Operation ID | Publisher ID | Inquiry needed | Inquiry completed | Allow update | Status information | Status | Previous update |
|---|---|---|---|---|---|---|---|---|
| User2 | 6 | Sensor1 | Yes | Yes | Yes | \<place>Headquarters\</place>\<floor>8F\</floor>\<area>Meeting room A\</area> | Keeping | Yes |
| | 7 | Sensor4 | Yes | No | No | \<place>Headquarters\</place>\<floor>8F\</floor>\<area>In front of EH\</area> | Setting | — |

*Fig. 13B*

History table after configuration information is registered (2)

| Presentity ID | Operation ID | Publisher ID | Inquiry needed | Inquiry completed | Allow update | Status information | Status | Previous update |
|---|---|---|---|---|---|---|---|---|
| User2 | 6 | Sensor1 | Yes | Yes | Yes | <place>Headquarters</place><floor>8F</floor><area>Meeting room A</area> | Keeping | — |
| | 7 | Sensor4 | Yes | No | No | <place>Headquarters</place><floor>8F</floor><area>In front of EH</area> | Keeping | — |
| | 8 | Sensor6 | Yes | No | No | <place>Headquarters</place><floor>7F</floor><area>West stairs</area> | Keeping | — |
| | 9 | Sensor7 | Yes | No | No | <place>Headquarters</place><floor>7F</floor><area>In front of EH</area> | Keeping | Yes |
| | 10 | Sensor9 | Yes | No | No | <place>Headquarters</place><floor>7F</floor><area>B Division</area> | Setting | — |

*Fig. 13C*

History table after configuration information is registered (3)

| Presentity ID | Operation ID | Publisher ID | Inquiry needed | Inquiry completed | Allow update | Status information | Status | Previous update |
|---|---|---|---|---|---|---|---|---|
| User2 | 6 | Sensor1 | Yes | Yes | Yes | <place>Headquarters</place><floor>8F</floor><area>Meeting room A</area> | Keeping | — |
| | 7 | Sensor4 | Yes | No | No | <place>Headquarters</place><floor>8F</floor><area>In front of EH</area> | Keeping | — |
| | 8 | Sensor6 | Yes | No | No | <place>Headquarters</place><floor>7F</floor><area>West stairs</area> | Keeping | — |
| | 9 | Sensor7 | Yes | No | No | <place>Headquarters</place><floor>7F</floor><area>In front of EH</area> | Keeping | — |
| | 10 | Sensor9 | Yes | No | No | <place>Headquarters</place><floor>7F</floor><area>B Division</area> | Keeping | Yes |
| | 11 | Sensor11 | Yes | No | No | <place>Headquarters</place><floor>7F</floor><area>C Division</area> | Setting | — |

Fig. 13D

History table after inquiry is made

| Presentity ID | Operation ID | Publisher ID | Inquiry needed | Inquiry completed | Allow update | Status information | Status | Previous update |
|---|---|---|---|---|---|---|---|---|
| User2 | 6 | Sensor1 | Yes | Yes | Yes | \<place>Headquarters\</place>\<floor>8F\</floor>\<area>Meeting room A\</area> | Keeping | — |
| | 7 | Sensor4 | Yes | Yes | No | \<place>Headquarters\</place>\<floor>8F\</floor>\<area>In front of EH\</area> | Keeping | — |
| | 8 | Sensor6 | Yes | Yes | No | \<place>Headquarters\</place>\<floor>7F\</floor>\<area>West stairs\</area> | Keeping | — |
| | 9 | Sensor7 | Yes | Yes | No | \<place>Headquarters\</place>\<floor>7F\</floor>\<area>In front of EH\</area> | Keeping | — |
| | 10 | Sensor9 | Yes | Yes | No | \<place>Headquarters\</place>\<floor>7F\</floor>\<area>B Division\</area> | Keeping | Yes |
| | 11 | Sensor11 | Yes | Yes | No | \<place>Headquarters\</place>\<floor>7F\</floor>\<area>C Division\</area> | Setting | — |

Fig. 13E

History table after response is made (1)

| Presentity ID | Operation ID | Publisher ID | Inquiry needed | Inquiry completed | Allow update | Status information | Status | Previous update |
|---|---|---|---|---|---|---|---|---|
| User2 | 10 | Sensor9 | Yes | Yes | Yes | <place>Headquarters</place><br><floor>7F</floor><br><area>B Division</area> | Setting | — |

*Fig. 13F*

History table after response is made (2)

| Presentity ID | Operation ID | Publisher ID | Inquiry needed | Inquiry completed | Allow update | Status information | Status | Previous update |
|---|---|---|---|---|---|---|---|---|
| User2 | 6 | Sensor1 | Yes | Yes | Yes | <place>Headquarters</place><br><floor>8F</floor><br><area>Meeting room A</area> | Setting | — |

*Fig. 13G*

History table after response is made (3)

| Presentity ID | Operation ID | Publisher ID | Inquiry needed | Inquiry completed | Allow update | Status information | Status | Previous update |
|---|---|---|---|---|---|---|---|---|
| User2 | 9 | Sensor7 | Yes | Yes | Yes | \<place>Headquarters\</place>\<floor>7F\</floor>\<area>In front of EH\</area> | Setting | — |
| | 11 | Sensor11 | Yes | Yes | No | \<place>Headquarters\</place>\<floor>7F\</floor>\<area>C Division\</area> | Keeping | — |

*Fig. 13H*

STATUS MANAGEMENT DEVICE AND STATUS MANAGEMENT METHOD

BACKGROUND OF THE INVENTION

1. Field of the Invention

The present invention relates to a status management system that manages and notifies status information of presentity. The status management system includes a presence server and a plurality of clients. The presence server stores the status information (hereinafter referred to as presence information) receives from any given client C1, and distributes it to other clients C2.

Presentity is a client that possesses presence information. Watcher is a destination client to which presence information of a presentity is distributed. Buddy is a presentity that provides its presence information for a watcher. Publisher is a client that updates presence information of a presentity other than itself. It does not matter whether or not a presentity allows the publisher to update its presence information.

2. Related Art

In anticipation of a coming ubiquitous society, a status management system has been proposed in which presence information of a presentity is updated by a client other than itself, namely, a publisher. In order to achieve the above mentioned system, publisher B that updates presence information of presentity A must obtain permission for updating presence information of presentity A in advance. A presence server stores, for each presentity, one or more publishers that are allowed by a presentity to update presence information thereof. Therefore, only the presence information updated by the allowed publisher B is stored as presence information of presentity A. Presence information updated by publisher C that is denied for updating by presentity A or presence information updated by publisher D that is neither allowed nor denied for updating by presentity A will not be stored as presence information of presentity A.

SUMMARY OF THE INVENTION

In a ubiquitous society, it is expected that an enormous amount of publishers transmit presence information of presentity A to the presence server. In that case, however, it is difficult for presentity A to allow or deny all the possible publishers prior to updating presence information therefrom. Thus, there will be many publishers that are neither allowed nor denied, in other words, publishers that are not recognized by a presentity.

For example, it is most likely that a newly added publisher will not be recognized by a presentity. Presence information from such unrecognized publishers will not be stored as presence information under the current status management systems. This makes it difficult to update presence information in real time and to notify it to a watcher. As a result, the watcher cannot know the difference between real presence information and the presence information that the watcher is seeing even though presence information has been already changed. This is the one of the biggest problem to be solved.

On the other hands if presence information updated by a publisher that a presentity does not recognize is stored as the presentity's presence information, the presentity's privacy might be invaded. Because presence information beyond the cognizance of the presentity is notified to a watcher while the presentity never even knows it. An object of the present invention is to manage presence update by publishers that a presentity does not recognize. Another object of the present invention is to notify presence information within the cognizance of a presentity so that the presentity's privacy is kept.

The first aspect of the present invention provides a status management device that is connected to a plurality of clients via a network and transmits presence information of each presentity to a watcher. This status management device includes the following units;

a presence storing unit for storing latest presence information of presentity;

a history storing unit for storing for each presentity history information that includes status information of each presentity;

a history update unit for receiving status information of a presentity from a publisher that is a client different from the presentity and for adding the status information to the history information;

a status notification unit for, in response to receiving the status information, transmitting a status change notification that notifies that there has been a change in status information of the presentity;

a configuration accepting unit for accepting a configuration to allow or to deny an update of status information by the publisher from the presentity and for storing the information after the notification is transmitted; and an update unit for updating the presence information of the presentity stored in the presence storing unit based on the status information received from the publisher when a configuration to allow the update is accepted.

In the present invention, when the publisher updates status information of the presentity, it is notified to a watcher of the presentity. The presentity may allow or deny the configuration for update by the publisher after the notification is transmitted. If the update is allowed, presence information of the presentity is updated based on the status information. If the update is denied, the presence information of the presentity is not updated. Even in such a case, the watcher can understand the change of the presence information because of receiving the status change notification of the presentity. Therefore, no matter which publisher status information is from, it can be reflected in the change of status information of a presentity. At the same time, the privacy of a presentity can be kept because the notification of presence information is performed within the cognizance of the presentity.

The status management device may further include an allow list storing unit for correlating recognized publisher that have been either allowed or denied to update the presence information stored in the presence storing unit with each presentity and for storing the same. The status notification unit may determine whether or not the publisher is included in the allow list and transmits the status change notification when not included.

The publisher that is not in the allow list is not recognized by the presentity. Even when such a client updates status information, the status change notification is transmitted to the watcher. Thus, when a new publisher is introduced, status change notification of a presentity can be sent to a watcher.

The status management device may further include a buddy list storing unit for correlating a buddy with each watcher and for storing the same. The status notification unit may compare a recognized client of a buddy with a publisher and transmit the status change notification based on the result.

For example, if any given publisher has been allowed by many buddies, the status change notification may be transmitted. Conversely, if any given publisher has been denied by many buddies, the status change notification may not to transmit. Thus, unnecessary notifications may be reduced by using the buddy list.

The status management device may her include a buddy list storing unit and an inquiry unit. The buddy list storing unit correlates a buddy with each watcher and stores the same. The inquiry unit transmits an inquiry whether or not to allow an update of presence information by the publisher to the presentity. The inquiry unit compares a recognized client and the publisher and transmits the inquiry based on the result.

For example, when status information is received from a publisher allowed by many buddies, the inquiry may be transmitted to the presentity. Conversely, when status information is received from a publisher denied by many buddies, it is feasible not to transmit the inquiry to the presentity. In this way, unnecessary inquiries to a presentity may be reduced by using the buddy list.

When the configuration accepting unit accepts a configuration to allow or to deny an update of presence information for the publisher, the configuration accepting unit preferably correlates the publisher, the presentity and the response from the presentity and stores the information into the allow list storing unit.

When status information is updated by an unrecognized publisher, that publisher is preferably registered either in the allow list or in the deny list in accordance with a response from a presentity. Even if a publisher is not recognized before updating the presence information, by storing a configuration about allow/deny that is configured after the update of status information is received, it becomes possible to apply that configuration when receiving the configuration in the future.

The status management device may further include a processing rule storing unit. The processing rule storing unit correlates a processing rule for processing status information received from the publisher with the presentity and stores the rule. The status notification unit preferably generates temporary information by processing the status information received from the publisher based on the processing rule, and transmits a status change notification that includes the temporary information.

Here, processed information not the status information itself from the publisher is transmitted. In this way, a watcher can receive a status change notification of the presentity while keeping the privacy of a presentity.

When the configuration accepting unit accepts a configuration to allow an update of presence information by the publisher, the configuration accepting unit preferably deletes status information that is older than the configuration information that is correlated with the presentity from the history information.

When the status information updated by the publisher is allowed, the previous status information is deleted. In this way, the amount of the history information can be minimized and the resources of the status management device can be used effectively.

When the configuration accepting unit accepts a configuration to deny an update of presence information by the publisher, the configuration accepting unit preferably deletes the status information from the publisher from the history information.

When the status information updated by the publisher is denied, the status of the history information is rolled back to the status before that status information was added thereinto. Because it is not necessary to keep the denied status information stored, the resources of the status management device can be used effectively by deleting unnecessary information.

Another aspect of the present invention further provides a status management program executed by a computer that is connected to a plurality of clients via a network and transmits status presence information of each client to a watcher. The program causes the computer to function as:

a presence storing unit for storing latest presence information of each presentity;

a history storing unit for storing history information that includes status information of each presentity;

a history update unit for receiving status information of a presentity from a publisher and for adding the status information to the history information;

a status notification unit for, in response to receiving the status information, transmitting a status change notification that notifies that there has been a change in status information of the presentity to a watcher of the presentity;

a configuration accepting unit for accepting a configuration to allow or to deny an update of presence information by the publisher from the presentity and for storing the configuration after the status change notification is transmitted; and an update unit for updating the presence information of the presentity stored in the presence storing unit based on the status information received from the publisher when a configuration to allow the update is accepted.

This program causes a computer terminal to function as the status management device of the first aspect of the present invention, and demonstrates effects identical to those of the first aspect of the present invention.

Another aspect of the present invention further provides a status management method executed by a computer that is connected to a plurality of clients via a network and transmits presence information of each presentity to a watcher. The method includes the following steps:

a presence storing step of storing latest presence information of each presentity;

a history storing step of storing history information that includes status information of each presentity;

a history update step of receiving status information of a presentity from a publisher and for adding the status information to the history information;

a status notification step of, in response to receiving the status information, transmitting a status change notification that notifies that there has been a change in status information of the presentity to a watcher of the presentity;

a configuration accepting step of accepting a configuration to allow or to deny an update of presence information by the publisher from the presentity and for storing the configuration after the status change notification is transmitted; and an update step of updating the presence information of the presentity stored in the presence storing step based on the status information received from the publisher when a configuration to allow the update is accepted.

This method is executed by the status management device of the first aspect of the present invention and demonstrates effects identical to those of the first aspect of the present invention.

Another aspect of the present invention further provides a computer readable recording medium on which is recorded a status management program executed by a computer that is connected to a plurality of clients via a network and transmits status presence information of each presentity to a watcher. The program causing a computer to function as:

a presence storing unit for storing latest presence information of each presentity;

a history storing unit for storing history information that includes status information of each presentity;

a history update unit for receiving status information of a presentity from a publisher and for adding the status information to the history information;

a status notification unit for, in response to receiving the status information, transmitting a status change notification that notifies that there has been a change in status information of the presentity to a watcher;

a configuration accepting unit for accepting a configuration to allow or to deny an update of presence information by the publisher from the presentity and for storing the configuration after the status change notification is transmitted; and an update unit for updating the presence information of the presentity stored in the presence storing unit based on the status information received from the publisher when a configuration to allow the update is accepted.

With the present invention, even if a publisher is not recognized by a presentity, a status change notification is transmitted to a watcher of the presentity. Therefore, even if status information updated by the publisher is denied by the presentity, the watcher can receive a status change notification. Therefore, no matter which publisher status information is from, it can be reflected in the change of status information of a presentity. At the same time, the privacy of a presentity can be kept because the status change notification is performed within the cognizance of the presentity.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

FIG. 3 is a conceptual explanatory diagram of a buddy list;

FIG. 4 is a conceptual explanatory diagram of a presence management table;

FIG. 5A is a conceptual explanatory diagram of an allow list in its initial state;

FIG. 5B is a conceptual explanatory diagram of the allow list after it is updated;

FIG. 6A is a conceptual explanatory diagram of a deny list in its initial state;

FIG. 6B is a conceptual explanatory diagram of the deny list after it is updated;

FIG. 7A is a conceptual explanatory diagram of a history table in its initial state;

FIG. 7B is a conceptual explanatory diagram of the history table after it has received a status update command from publisher "Sensor 4";

FIG. 7C is a conceptual explanatory diagram of the history table when an update of a temporary information is possible;

FIG. 7D is a conceptual explanatory diagram of the history table when the update of status data by publisher "Sensor 4" has been allowed;

FIG. 7E is a conceptual explanatory diagram of the history table when the update of status data by publisher "Sensor 4" has been denied;

FIG. 12 is a conceptual explanatory diagram of an inquiry condition table that the presence server of FIG. 11 has;

FIG. 13A is a conceptual explanatory diagram of a history table in its initial state;

FIG. 13B is a conceptual explanatory diagram of the history table after receiving a first status update command;

FIG. 13C is a conceptual explanatory diagram of the history table after receiving a fourth status update command;

FIG. 13D is a conceptual explanatory diagram of the history table immediately after receiving a fifth status update command;

FIG. 13E is a conceptual explanatory diagram of the history table immediately after transmitting an inquiry;

FIG. 13F is a conceptual explanatory diagram of the history table after receiving a response in response to the inquiry;

FIG. 13G is a conceptual explanatory diagram of the history table after receiving another different response in response to the inquiry;

FIG. 13H is a conceptual explanatory diagram of the history table after receiving yet another different response in response to the inquiry;

DETAILED DESCRIPTION OF THE PREFERRED EMBODIMENTS

Outline of the Invention

Figure 1:
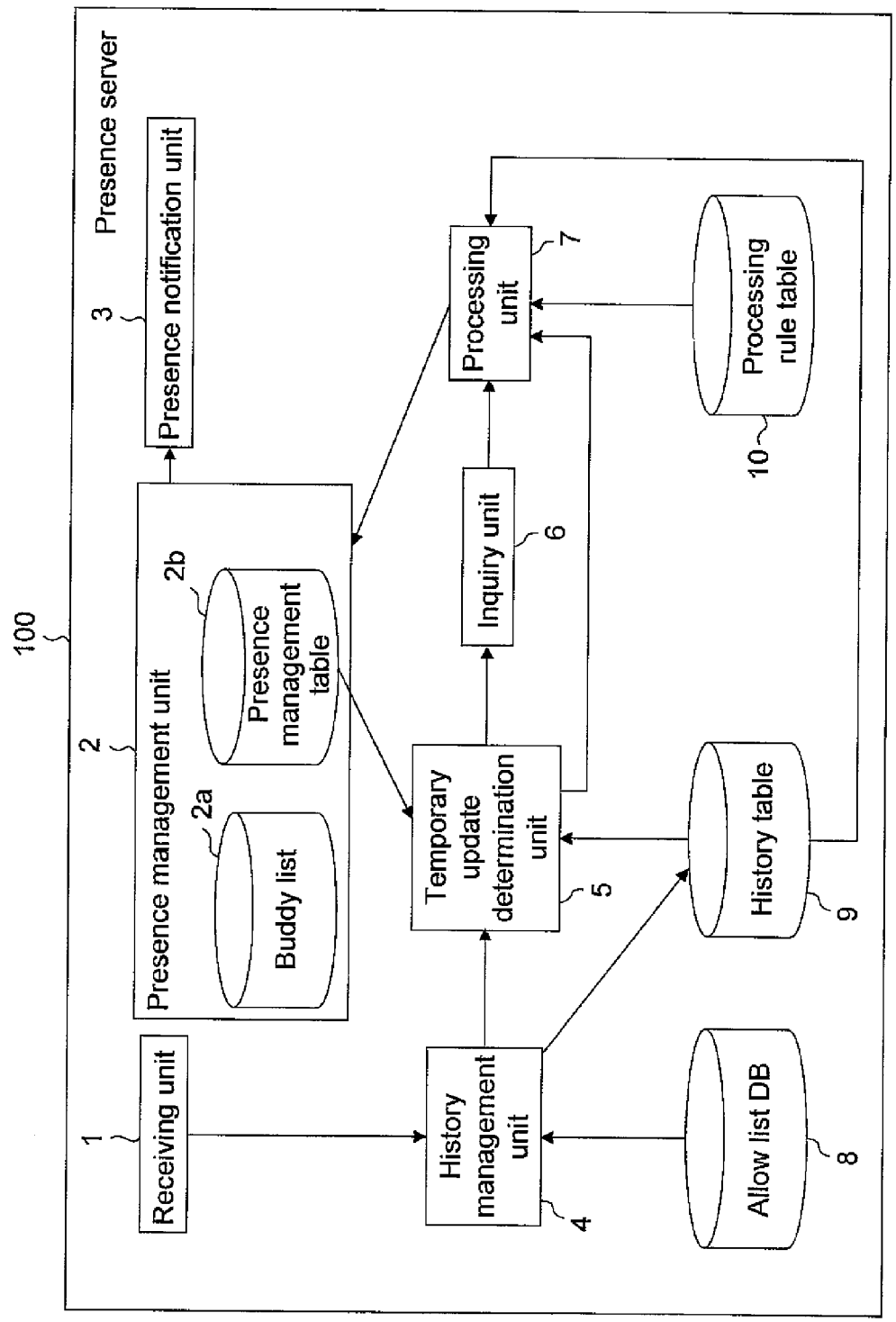
FIG. 1 is a block diagram showing one example of a functional configuration of a presence server.

FIG. 1 is a block diagram showing one example of a functional configuration of a presence server 100 of the present invention. The presence server 100 is connected to a plurality of clients via a network, which form a status management system. The presence server 100 receives status information from clients, updates presence information of each presentity based on the status information, and distributes the updated presence information to a watcher of each presentity. Clients include a wide range of devices that can generate status information such as various sensors in addition to computer terminals that users operate. Hereinafter, status information that the presence server 100 receives from a client is referred to as "status information" and is strictly distinguished from "presence information" that is obtained by processing the status information. Status information may be transmitted from a presentity or may be transmitted from a publisher. Presence information may be acquired by processing status information that a presentity itself has transmitted, or may be acquired by processing status information that a publisher who is given permission by a presentity has transmitted. Note that a case where status information is made to be presence information without changing it may be a special case of the processing.

Figure 2:
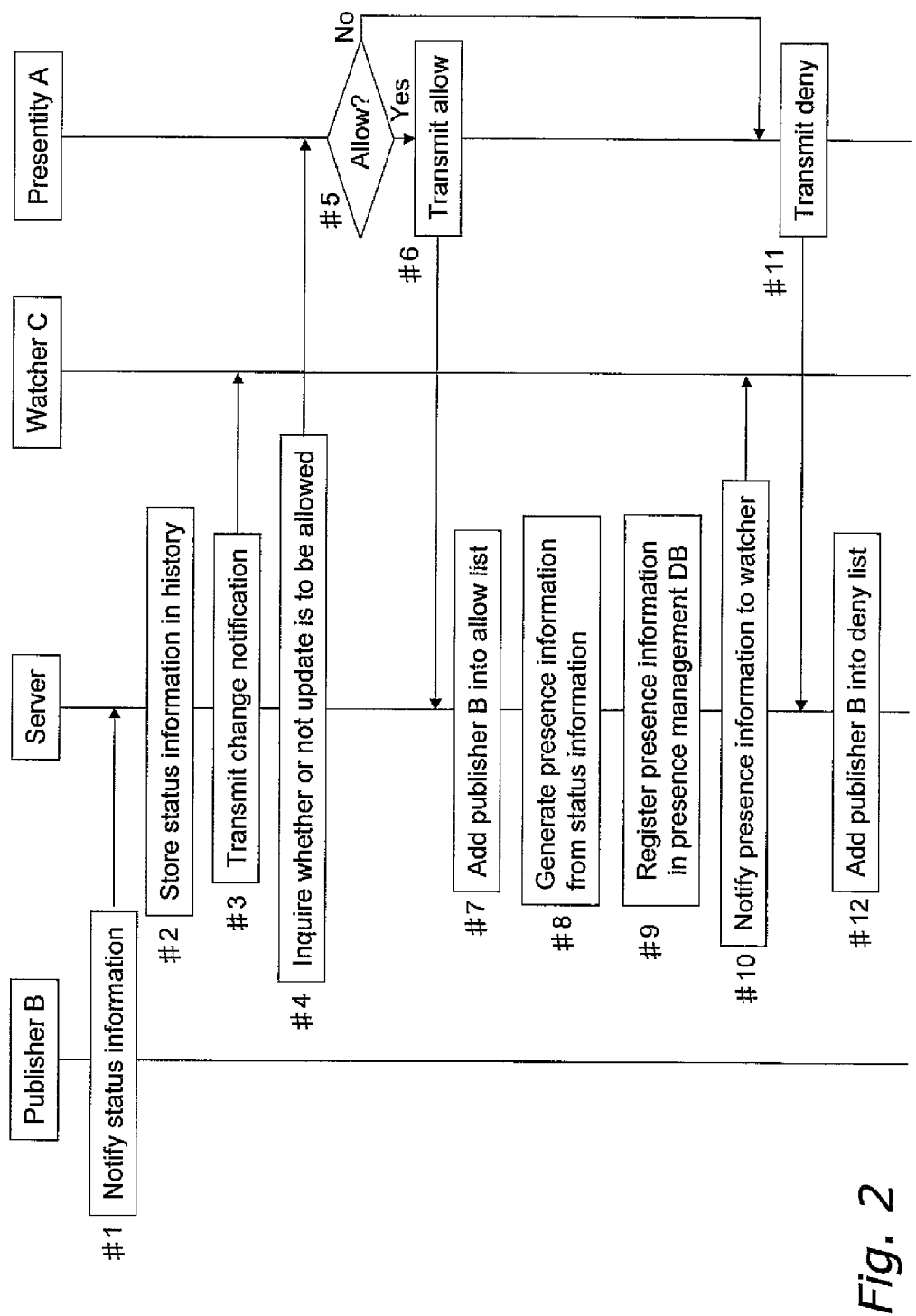
FIG. 2 is an explanatory diagram showing an outline of a process flow carried out by a status management system that includes the presence server of FIG. 1.

FIG. 2 is an explanatory diagram showing an outline of a process flow carried out by the status management system that includes the presence server 100. When the presence server 100 receives status information that indicates a status of presentity A from publisher B (#1), the presence server 100 stores it in a history table 9 and temporarily rewrites presence information (#2). The presence information that has been temporarily rewritten is called temporary information. Thereafter, the presence server 100 notifies the temporary information of presentity A to a watcher of presentity A, namely, watcher C (#3). This notification is transmitted by a change notify command that notifies the update of presence information. Note, however, that hereinafter the notification of temporary information is referred to as change notification in order to distinguish it from the update of presence information. The presence server 100 may transmit an inquiry to presentity A as to whether or not new presence information based on the status information is to be set (#4).

If a response "allow" is received in response to the aforementioned inquiry (#5 and #6), the presence server 100 adds publisher B into an allow list 8*a* in an allow list DB 8 (#7). Also, the presence server 100 generates the presence information based on the status information read out from a history table 9 (#8). The generated presence information is registered in a presence management DB 2*b* (#9). The watcher C, who is a watcher of presentity A, is notified of the presence information by the change notify command (#10).

If a response "deny" is received in response to the aforementioned inquiry (#11), the presence server 100 adds publisher B into a deny list 8*b* in the allow list DB 8 (#12). Also, the presence server 100 deletes the status information received from publisher B from the history table 9.

With the aforementioned processes, the watcher C can know that there has been a change in the presence information of presentity A even when publisher B is neither allowed nor denied in advance (#3). When publisher B is subsequently allowed, the watcher C knows the new presence information of presentity A (#9). Even when publisher B is subsequently denied, the watcher C knows that there has been a change in the presence information of presentity A by the change notification. Therefore, even when there is a change in publishers that a presentity is not aware of, a change of presence information can be notified while keeping the presentity's privacy.

First Embodiment

<<Configuration>>

Now, a functional configuration of the presence server 100 according to a first embodiment of the present invention will be explained with reference to FIG. 1. The presence server 100 is configured with a computer terminal having a CPU, a ROM, a RAM, a hard disk, etc. The CPU of the presence server 100 functions as a receiving unit 1, a presence management unit 2, a presence notification unit 3, a history management unit 4, a temporary update determination unit 5, an inquiry unit 6 and a processing unit 7. Further, the presence server 100 has a buddy list 2*a*, a presence management table 2*b*, an allow list database (hereinafter abbreviated as DB) 8, a history table 9 and a processing rule table 10 on the ROM and the hard disk. First, an explanation for each data base and table, and then for the function of each unit is given. In the present status management system, each client can be uniquely specified by a client ID.

Database and Table (1) Buddy List

FIG. 3 is a conceptual explanatory diagram of the buddy list 2*a*. The buddy list 2*a* stores a buddy of each client. More specifically, the buddy list 2*a* correlates "watcher ID", "buddy ID" and "display name" and stores the information. "Watcher ID" is a client ID of a client wishing to subscribe presence information of a buddy. "Buddy ID" is a client ID of a buddy. "Display name" is a name of a buddy to be displayed on a client PC of a watcher.

(2) Presence Management Table

FIG. 4 is a conceptual explanatory diagram of the presence management table 2*b*. The presence management table 2*b* manages the latest presence information of each presentity and its watcher. More specifically, the presence management table 2*b* correlates "presentity ID", "presence information", "watcher ID", and "status" and stores the information. "Presentity ID" is a client ID that specifies a presentity corresponding to any given presence information. "Presence information" is information of a presentity by processing status information of the presentity. Presence information may be set by a presentity itself or may be set by a publisher. "Watcher ID" is a client ID of a destination client to which presence information is distributed, namely, a watcher. "Status" indicates whether the notification of presence information to a watcher is allowed or denied. "Allow" indicates that the notification is allowed, "deny" indicates that the notification is denied, and "asking" indicates that an inquiry is being made to a presentity as to whether or not the distribution is allowed.

(3) Allow List DB (3-1) Allow List

FIG. 5 is a conceptual explanatory diagram of the allow list 8*a* stored in the allow list DB 8. FIG. 5A shows the allow list 8*a* in its initial state. FIG. 5B shows the allow list 8*a* after it is updated whereby publisher "Sensor 4" is newly added. The allow list correlates "presentity ID", "allowed publisher ID" and "allowed time period", and stores the information. "Presentity ID" is a client ID of a presentity. "Allowed publisher ID" is a client ID of a publisher that is allowed to update presence information of a presentity. "Allowed time period" indicates a time period in which a publisher is allowed to update presence information. By correlating and storing "allowed time period" with the others, a presentity is able to allow the update of its presence information during a specified time period. Note, however, that "allowed time period" is not necessarily essential. "Allowed time period" is one kind of condition for allowing an update of presence information, but it is also possible to use other kinds of condition. For example, if any attributes are set for a publisher, having a predetermined attribute may be used as a condition for allowing the update.

(3-2) Deny List

FIG. 6 is a conceptual explanatory diagram of the deny list 8*b* stored in the allow list DB 8. FIG. 6A shows the deny list 8*b* in its initial state. FIG. 6B shows the deny list 8*a* after it is updated whereby publisher "Sensor 4" is newly added. The deny list correlates "presentity ID", "denied publisher ID" and "denied time period", and stores the information. "Presentity ID" is a client ID of a presentity. "Denied publisher ID" is a client ID of a publisher that is denied to update presence information of a presentity. "Denied time period" indicates a time period in which a publisher cannot update presence information. By correlating and storing "denied time period" with the others, a presentity is able to deny the update of its presence information during a specified time period. Note, however, that "denied time period" is not necessarily essential. "Denied time period" is one kind of condition for denying an update of presence information, but it is also possible to use other kinds of condition. For example, if any attributes are set for a publisher, having a predetermined attribute may be used as a condition for denying the update.

(4) History Table

FIGS. 7A to 7E are conceptual explanatory diagrams of the history table 9. The history table correlates status information received from a publisher and a presentity and stores the information. FIG. 7A shows the history table 9 in a state at one point (hereinafter, "initial state"). FIG. 7B shows the history table 9 after receiving a status update command from publisher "Sensor 4". FIG. 7C shows the history table 9 when a temporary update is possible. The detail of "temporary update" will be explained later. FIG. 7D shows the history table 9 when presentity "User 2" has allowed the update of its presence information by publisher "Sensor 4". FIG. 7E shows the history table 9 when presentity "User 2" has denied the update of its presence information by publisher "Sensor 4". The detail of changes in the history table 9 will be explained later. Here, information stored in the history table 9 will be explained first.

More specifically, the history table 9 correlates "presentity ID", "operation ID", "publisher ID", "inquiry needed", "allow update", "status information", "status" and "previous update" and stores the information. "Presentity ID" is a client ID of a presentity. "Operation ID" specifies an entry in the history table 9. "Publisher ID" is a client ID of a publisher that updates status information. An "inquiry needed" field indicates whether or not an inquiry to the presentity is necessary as to whether or not presence information based on the status information is to be set. An "allow update" field indicates whether or not the update of presence information based on the status information is allowed by the presentity. The status information received from the publisher is stored in a "status information" field. If a "status" field indicates "setting", it means that the entry concerned is the latest entry, i.e. a current entry. If it indicates "keeping", it means that a status information of the entry concerned is past status information. If a "previous update" field indicates "Yes", it means that the entry concerned had been a current entry before the latest current entry.

For example, an entry with operation ID "6" in the history table 9 shown in FIG. 7A (hereinafter referred to as entry "6") indicates that presentity "User 2" has allowed publisher "Sensor 1" to update its presence information. It also indicates that the permission was obtained in response to an inquiry to the presentity. The detail of how the history table 9 is updated is explained later.

(5) Processing Rule Table

Figure 8:
FIG. 8 is a conceptual explanatory diagram of a processing rule table.

FIG. 8 is a conceptual explanatory diagram of the processing rule table 10. The processing rule table 10 stores rules for processing status information. More specifically, the processing rule table 10 correlates "presentity ID", "publisher ID", "rule for allowed publisher" and "rule for unrecognized publisher" and stores the information. "Presentity ID" and "publisher ID" are the same as those in the history table 9. In the figure, "*" indicates any given publisher. "Rule for allowed publisher" indicates a rule when status information is processed into presence information. Rule for allowed publisher is applied in a case where a presentity has allowed a publisher to update its presence information. Rule for unrecognized publisher is a rule when status information from an unrecognized publisher is processed into temporary information. As mentioned earlier, temporary information is presence information that is temporarily updated. Unrecognized publisher means a publisher that is registered neither in the allow list 8a nor in the deny list 8b.

Now, an example of rule for allowed publisher will be explained in detail. FIG. 8 shows a processing rule when status information from a publisher is tagged with <place>, <floor> and <area>. A rule for allowed publisher "<place>+<floor>+<area>" means that all data is consolidated. For example, status information "<place>headquarters</place><floor>6F</floor><area>A Division</area>" is processed into "headquarters 6F A Division (08/18 10:15)". Here, the time information "(08/18 10:15)" indicates the time when the presence information is updated and is a value assigned by the status management device.

Next, rule for unrecognized publisher will be explained in detail. For example, rule for unrecognized publisher "<place>" indicates that data with a tag <place> in status information is extracted. When this rule is applied, status information "<place>headquarters</place><floor>8F</floor><area>meeting room A</area>" is processed into temporary information "headquarters". Consequently, the temporary information "headquarters" is transmitted to a watcher.

It is possible to update location information in a proprietary XML (eXtensible Markup Language) format as explained above, but the PML (Physical Markup Language) that EPCglobal, that is promoting the standardization of distribution management system using an RFID tag, has established may also be employed. Because the PML makes it possible to describe a relative location of a publisher with a specified location as a starting point using a <loc> tag, the location information can be described in a single format by utilizing the PML as the location information.

Function of Each Unit

Next, the function that each unit of the presence server 100 achieves will be explained. The function of the presence server 100 is broadly divided into (1) presence management function, (2) temporary information update function, (3) change notification function, (4) status accepting function, and (5) presence information update function.

(1) Presence Management Function

The presence server 100 accepts the update of presence information by a presentity itself. The presence server 100 also distributes the updated presence information to a watcher of the presentity. In addition, the presence server 100 accepts the registration of a buddy list.

(1-1) Update and Distribution of Presence Information

The update and distribution of presence information will be explained more in detail. When receiving a presence update command, the receiving unit 1 determines whether that presence update command is transmitted by a presentity itself or by a publisher. This determination is performed by comparing a source client ID included in the presence update command and a presentity ID that specifies a subject whose status is to be updated. When the two match, the receiving unit 1 determines that the presence update command is transmitted by the presentity itself. The received status information and client ID are passed to the presence management unit 2. The presence management unit 2 updates presence information based on the received status information, and the presence notification unit 3 distributes the new presence information to a watcher. The new presence information is notified by a presence notify command. At this time, the presence management unit 2 can refer to the processing rule table 10 and process the received status information into the presence information. A rule for allowed publisher can be used as a processing rule.

(1-2) Registration of Buddy List

Adding a buddy to a buddy list will be explained more in detail. When receiving a subscribe command from a client via the receiving unit 1, the presence management unit 2 updates the buddy list 2a and the presence management table 2b based on this subscribe command. Included in the subscribe command are a watcher ID, a buddy ID and a display name. These are correlated and registered in the buddy list 2a and the presence management table 2b. In addition, the presence management unit 2 makes an inquiry to a buddy whether or not the presence information is to be distributed, and stores a response to this inquiry in the presence management table 2b. In this way, the distribution of the presence information against the intention of the buddy whose presence information will be subscribed can be prevented.

(2) Temporary Update Function

When receiving status information from a publisher, the presence server 100 adds it to the history table 9. The presence server 100 may also determine by referring to the buddy list 2*a* whether or not to transmit a change notification or whether or not to transmit an inquiry to the presentity (hereinafter referred to as temporary update). In this case, the presence server 100 updates the history table 9 in accordance with the determination.

(2-1) Registration of Status Information

At first, adding of status information to the history table is explained in detail. When the receiving unit 1 determines that the received status update command is from a publisher, the received status update command is passed to the history management unit 4. At this time, a publisher ID, a presentity ID and status information are included in the status update command. The history management unit 4 adds the status information to the history table 9 when the publisher ID and the presentity ID are not correlated either in the allow list 8*a* or in the deny list 8*b*. In other words, the status information is added to the history table 9 when the publisher is not recognized by the presentity. The history table in FIGS. 7A and 7B show the change in the history table 9 by a status update command from a publisher. In FIG. 7B, entry "7" is newly added. This entry has status information from publisher ID "Sensor 4" written therein.

On the other hand, there may be a case where the publisher ID and the presentity ID are correlated and registered in the allow list 8*a*. In other words, this is a case where the update of presence information by the publisher is already allowed by the presentity. In this case, the history management unit 4 adds status information to the history table 9 and passes the status information to the presence management unit 2. The status information is processed into presence information in accordance with a rule for allowed publisher, added in the presence management table 2*b* and notified to a watcher Conversely, there may be a case where the publisher ID and the presentity ID are correlated and registered in the deny list 8*b*. In other words, this is a case where the update of presence information by the publisher is already denied by the presentity. In this case, the history management unit 4 discards status information and waits for the next status update command.

(2-2) Temporary Update

Next, the temporary update will be explained in detail. The temporary update determination unit 5 filters publishers before a change notification and an inquiry are made, which will be discussed later. In other words, the temporary update determination unit 5 determines whether or not a change notification or an inquiry as to whether or not the update of presence information is allowed should be transmitted. This determination is made because transmitting a change notification and an inquiry in response to every status information will result in an increased load on the presence server 100 and the network, as well as resulting in transmitting unnecessary information to a watcher and a presentity. This determination can be made based, for example, on the allow list 8*a* and the deny list 8*b* of buddies of a presentity. For example, if any given publisher is denied by more than a predetermined percentage of the buddies of a presentity, it can be determined that a temporary update is not possible. In this case, a change notification and an inquiry are not transmitted. Conversely, if any given publisher is allowed by more than a predetermined percentage of the buddies of a presentity, it can be determined that a temporary update is possible. In this case, a change notification and an inquiry are transmitted.

FIG. 7C shows the history table 9 when the change notification and the inquiry are transmitted after it is determined that the temporary update is possible. In entry "7", a value in the "inquiry needed" field is changed to "Yes" and a value in the "status" field to "setting". This indicates that a current entry is entry "7". In addition, in entry "6" that has been originally registered, a value in the "status" field is changed to "keeping" and a value in the "previous update" to "Yes". This indicates that entry "6" was the current entry immediately before. If publisher "Sensor 4" is denied by the presentity as a result of the inquiry, entry "6" becomes the current entry again based on the value in the "previous update" field.

(3) Change Notification Function

The presence server 100 transmits a change notification when status information from a publisher that is unrecognized by a presentity is received. Specifically, the presence notification unit 3 transmits a change notification indicating that there has been a change in status information of a presentity to a watcher thereof. In the present embodiment, when the temporary update determination unit 5 determines that a temporary update is possible, the temporary information is set in the presence management table 2*b*. Temporary information is presence information that is temporarily set, and is generated from status information by the processing unit 7 using a rule for unrecognized publisher in the processing rule table 10. The presence notification unit 3 transmits a change notify command to a watcher because presence information is changed. In the present embodiment, a change notify command that notifies temporary information is called a change notification in order to distinguish it from a normal presence notify command.

A change notification includes information indicating that status information of a presentity is changed. Temporary information of the present embodiment is information that includes a part of status information. However, temporary information does not always have to be a part of status information. For example, temporary information may be a predetermined value or message. By notifying information different from status information itself as a change notification to a watcher, it becomes possible to notify the watcher that some kind of status change has occurred to a presentity. Moreover, it becomes possible to prevent status information of a presentity from being known by a watcher beyond the cognizance of the presentity and to keep the presentity's privacy.

(4) Update Accepting Function

The presence server 100 accepts from a presentity a configuration as to whether or not to allow a publisher to update its presence information, and stores it in the allow list DB 8.

(4-1) Inquiry

In the present embodiment, the inquiry unit 6 transmits to a presentity an inquiry as to whether or not to allow a publisher to update its presence information. When a response to the inquiry is received from the presentity, the inquiry unit 6 performs a process according to the response. The inquiry includes, for example, a publisher ID and detailed information regarding a publisher. Detailed information regarding a publisher may include a location where the publisher is placed and a name of a manager of a publisher.

Figure 9:
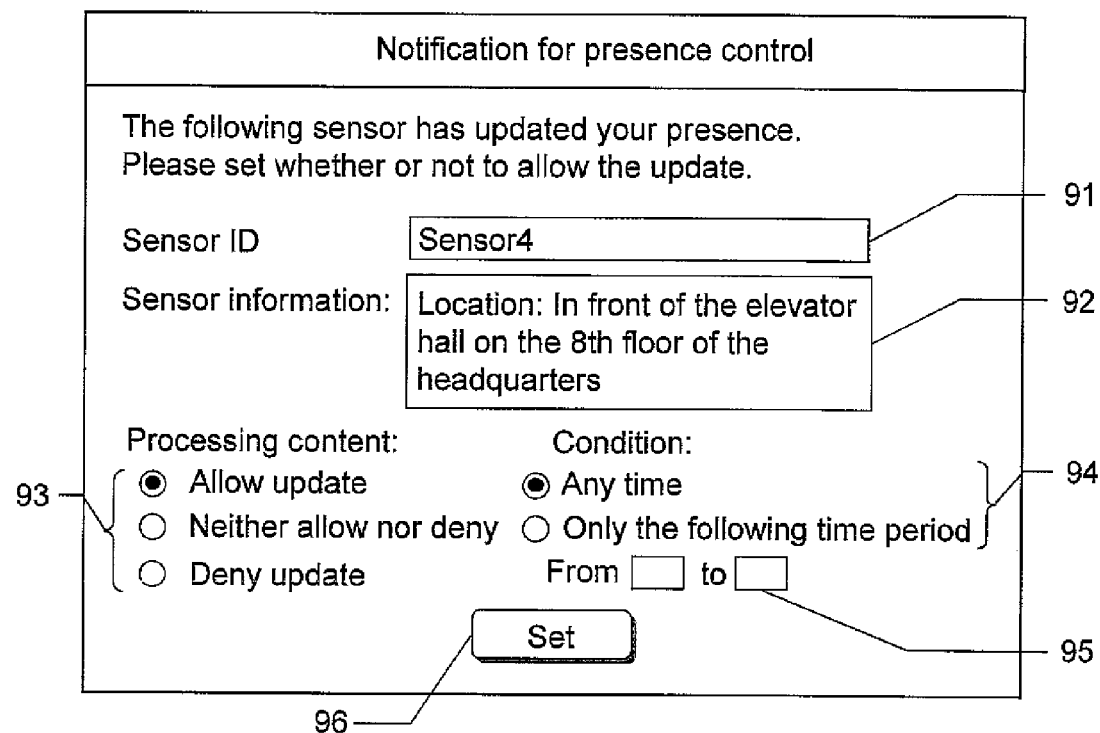
FIG. 9 shows one example of a configuration screen shot that the presence server of FIG. 1 transmits to a presentity.

FIG. 9 shows one example of a screen that the inquiry unit 6. The inquiry unit 6 accepts a response from a presentity on this screen. The screen has a publisher field 91, a publisher detail field 92, processing content selection radio buttons 93, condition selection radio buttons 94, a time input field 95 and a set button 96. A publisher ID is displayed in the publisher field 91.

In the figure, "Sensor 4" is displayed. A location of the sensor, i.e. the publisher in this example is displayed in the publisher detail field 92. The presentity selects a processing content, i.e. "allow", "deny" or "neither" using the processing content selection radio buttons 93 based on the publisher ID and the detailed information regarding the publisher. Also in this example, a time condition such as an allowed time period and a denied time period can be set using the time input field 95. When the set button 96 is pressed after the aforementioned configuration is set, a response is transmitted to the presence server 100. This response includes the publisher ID, the selected processing content and the selected condition. The time condition may also be included if it has been set.

(4-2) Process After Response

If a response "allow" is received, the inquiry unit 6 deletes an entry made before the current entry from the history table 9. In other words, only the latest status information updated by the status update command from the publisher is made to remain in the history table 9 with respect to the presentity concerned. The history table 9 in FIG. 7D indicates that the status information from "Sensor 4" that is newly allowed is the latest status information of presentity "User 2". Also, the inquiry unit 6 correlates the allowed publisher ID and the presentity ID and add the information to the allow list 8a. Further, presence information is generated based on the allowed configuration information and is stored in the presence management table 2b.

If a response "deny" is received, the inquiry unit 6 deletes the current entry in the history table 9. In other words, the entry that includes the status information from the denied publisher is deleted, and the previous current entry is set back to the current entry again. Also, presence information is generated based on the status information of the previous current entry and is stored in the presence management table 2b. FIG. 7E shows the history table 9 from which entry "7" that includes the status information from denied publisher "Sensor 4", is deleted. In this history table 9, entry "6" that had been the current entry before entry "7" became the current entry is now the current entry again. The presence information is generated based on the status information of entry "6" and is stored in the presence management table 7b. In this way, when the update of presence information by a publisher is denied by a presentity, status information and presence information of the presentity can be revived using the history table 9. The inquiry unit 6 further correlates the denied publisher ID and the presentity ID and adds the information to the deny list 8b.

(5) Presence Information Update Function

The presence server 100 updates presence information of a presentity in accordance with a response from the presentity. More specifically, the processing unit 7 generates new presence information based on status information from an allowed publisher, and stores it in the presence management table 2b. A rule for allowed publisher in the processing rule table 10 is used for generating the presence information. The new presence information is notified to a watcher as a presence notify command by the presence notification unit 3. Therefore, when a publisher is allowed, a watcher receives a change notification first and then receives new presence information. Conversely, when a publisher is denied, a watcher receives a change notification and presence information that had been set immediately before.

<<Processing>>

(1) Main Routine

Figure 10A:
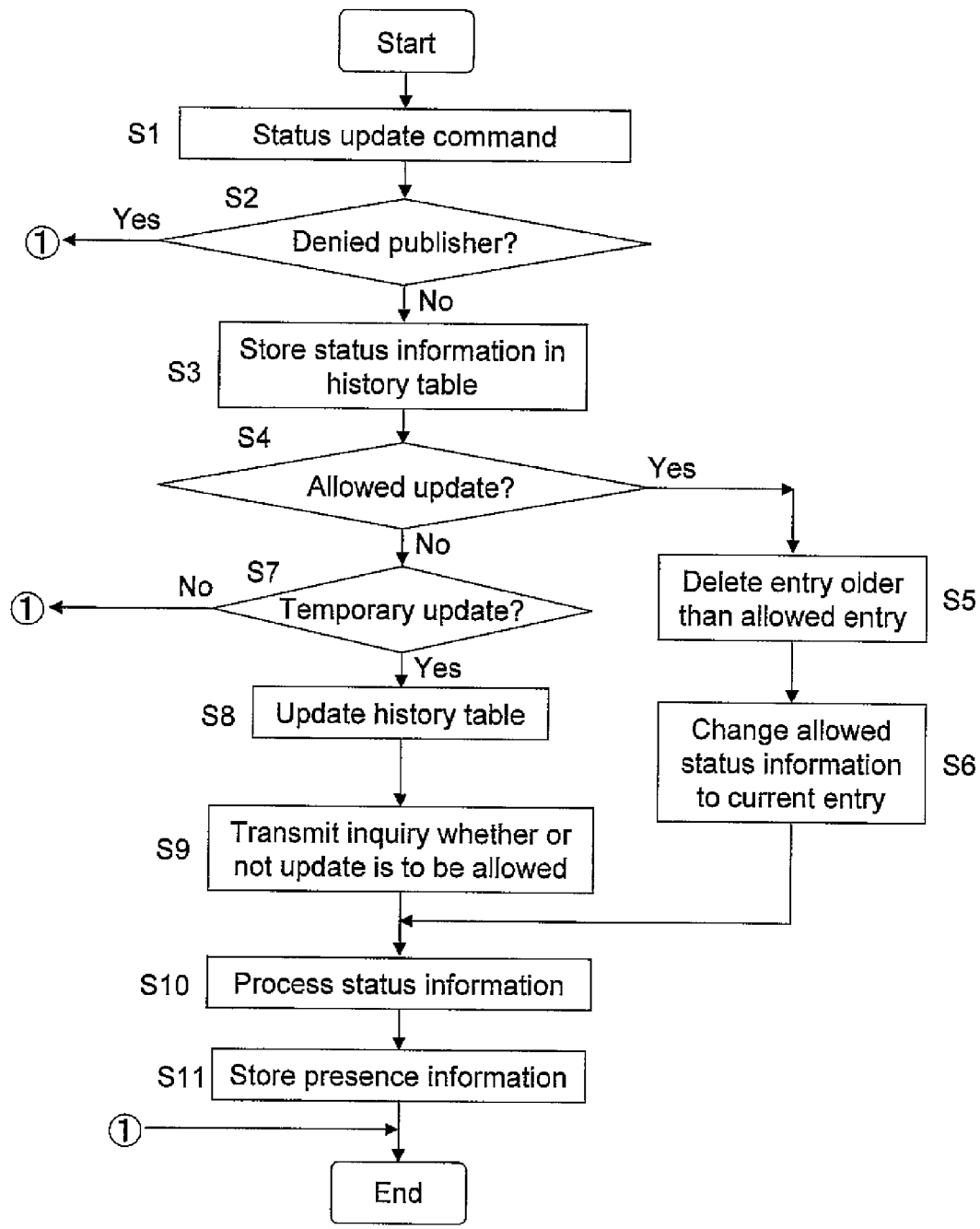
FIG. 10A is a flow chart showing one example of a main routine carried out by the presence server of FIG. 1.

FIG. 10A is a flow chart showing one example of a process flow of a main routine carried out by the presence server 100. In order to facilitate the explanation, only the update of presence information by a publisher is explained in this figure and the update of presence information by a presentity itself is omitted.

Step S1: The presence server 100 waits for the receipt of a status update command, and the presence server 100 proceeds to Step S2 when receiving it.

Step S2: The presence server 100 determines whether or not a publisher that transmitted the status update command is already denied by a presentity. This determination is made based on whether or not a publisher ID of the publisher and a presentity ID of the presentity whose presence information is set are correlated and stored in the deny list 8b. If the publisher is already denied by the presentity, the process ends. The process ends here because it can be assumed that it complies with the presentity's wishes not to transmit even a change notification, let alone to update the presence information based on status information from the publisher.

Step S3: The presence server 100 stores the received status information in the history table 9.

Step S4: The presence server 100 determines whether or not the publisher that transmitted the status update command is already allowed by the presentity. This determination is made based on whether or not the publisher ID of the publisher and the presentity ID of the presentity whose presence information is set are correlated and stored in the allow list 8a. If the publisher is already allowed, the presence server 100 proceeds to Step S5. If the publisher is not allowed, the presence server 100 proceeds to Step S7 which will be discussed later.

Step S5-S6: The presence server 100 deletes from the history table 9 an entry that is older than an entry that includes the status information from the current allowed publisher (S5). With reference to FIG. 7C, entry "6" is deleted from the history table 9. The presence server 100 adds the entry that includes the status information from the allowed publisher as a current entry (S6). Referring to FIG. 7D, the "status" field of entry "7" is changed to "setting".

Step S7: The presence server 100 determines whether or not a temporary update is to be performed. As discussed earlier, this determination can be made based on whether or not many of the buddies of the presentity have allowed the publisher concerned. When it is determined that the temporary update is not to be performed, the presence server 100 terminates the process. When it is determined that the temporary update is to be performed, the presence server 100 proceeds to Step S8.

Step S8: The presence server 100 changes the entry of the status information in the history table 9 to a current entry. In other words, a value of the "status" field for the new entry is changed to "setting". Also, a value of the "status" field for the other old entry is changed to "keeping", and a value of the "previous update" field for the original current entry is changed to "Yes". In this way, even when the publisher is denied, entry that should be revived as a current entry can be determined.

Step S9: The presence server 100 transmits to the presentity an inquiry as to whether or not the update of presence information by the publisher is allowed.

Step S10-S11: When the status information is received from the unrecognized publisher (S4 and S7-S9), the presence server 100 generates presence information from the status information based on the rule for unrecognized publisher (S10). The generated presence information is correlated with the presentity ID and stored in the presence management table 2b (S11). If the publisher is denied by the presentity, this presence information might be set back to the value of the previous presence information. The presence server 100 further transmits the new presence information as a change notification to the watcher.

When the status information is received from the allowed publisher (S4-S6), the presence server 100 generates presence information from the status information based on the rule for allowed publisher (S10). The generated presence information is correlated with the presentity ID and stored in the presence management table 2b (S11). Further, the presence server 100 transmits a presence notify command in which the new presence information is described to the watcher.

(2) Response Process

Figure 10B:
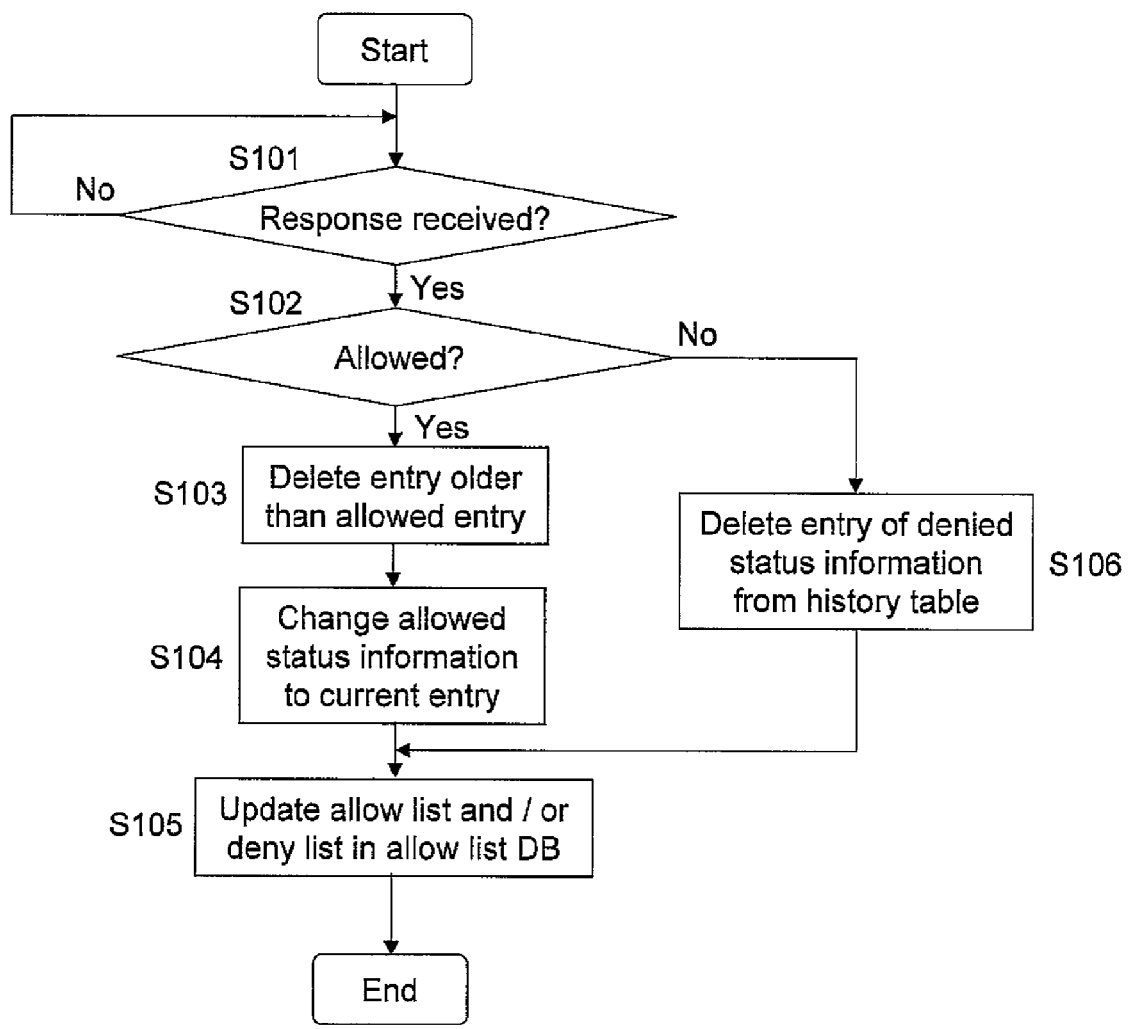
FIG. 10B is a flow chart showing one example of a response process carried out by the presence server of FIG. 1.

FIG. 10B is a flow chart showing one example of a response process carried out by the presence server 100 in accordance with a response from a presentity.

Step S101-S102: The presence server 100 waits for a response from the presentity (S101) and the presence server 100 proceeds to Step S103 if the response is "allow" (S102). If the response is "deny", the presence server 100 proceeds to Step S106 which will be discussed later.

Step S103-S105: The presence server 100 deletes an entry older than the entry that includes the status information from a newly allowed publisher with respect to the presentity (S103). With reference to FIG. 7C again, entry "6" is deleted from the history table 9. The presence server 100 also adds the entry that includes the status information from the newly allowed publisher as the current entry (S104). With reference to FIG. 7D again, the "status" field of entry "7" is changed to "setting". The presence server 100 further correlates a client ID of the allowed publisher and the presentity ID and stores the information in the allow list 8a (S105).

Step S106: The presence server 100 deletes the entry that includes the status information from a denied publisher from the history table (S106). With reference to FIG. 7C again, entry "7" is deleted from the history table 9. The presence server 100 also sets an entry that had been the current entry before the deleted entry became the current entry back to the current entry. With reference to FIG. 7E, the "status" field of entry "6" is changed to "setting". Further, the presence server 100 generates presence information based on status information in this current entry and stores it in the presence management table 7b. In other words, the presence server 100 sets the presence information back to the one before the temporary information was set. The presence server 100 correlates a client ID of the denied publisher and the presentity ID and stores the information in the deny list 8b (S106).

With the aforementioned processes (1) and (2), even when a status update command is received from a publisher that a presentity does not recognize, it is possible to notify a watcher that there has been some kind of change in the presentity's status. Also, because a change notification and an inquiry whether or not the update is allowed are transmitted in response to a part of the status update commands, it is possible to reduce the burden on a watcher and a presentity as well as the load on the presence server. Moreover, when a presentity denies a publisher, latest status information of the presentity can be set back to the status before the publisher was denied.

Second Embodiment

The presence server 100 in the first embodiment transmits an inquiry to a presentity every time a status update command is received from a publisher. A presence server 100' in the present embodiment, on the other hand, an inquiry as to whether or not to allow or to deny a plurality of status update commands is collectively transmitted to the presentity.

<<Configuration>>

Figure 11:
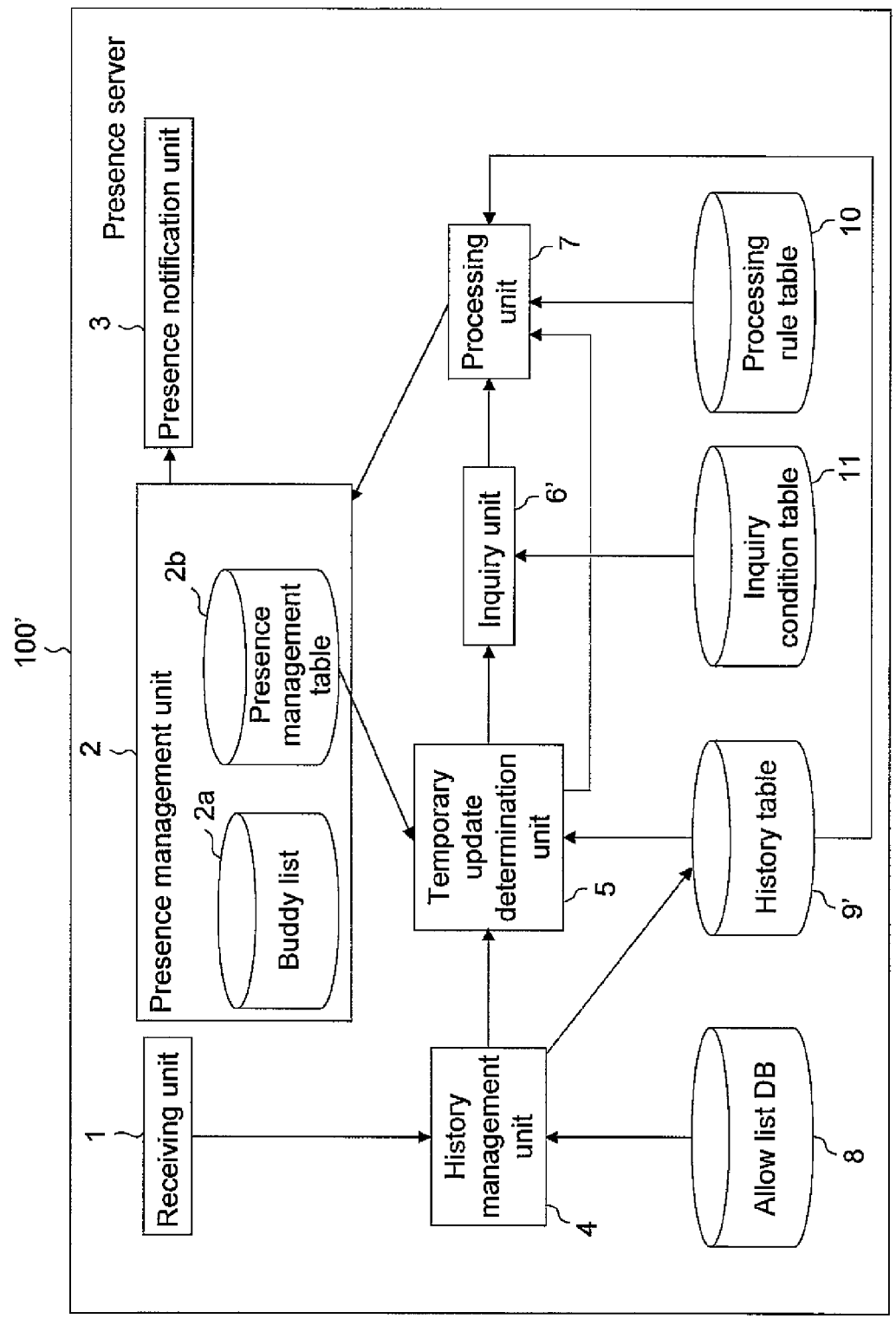
FIG. 11 is a block diagram showing a functional configuration of a presence server according to a second embodiment.

FIG. 11 is a block diagram showing a functional configuration of a presence server 100' according to a second embodiment. In the figure, the same reference numerals are assigned to the blocks that have the same function described in the first embodiment. A CPU of the presence server 100' functions as a receiving unit 1, a presence management unit 2, a presence notification unit 3, a history management unit 4, a temporary update determination unit 5, an inquiry unit 6' and a processing unit 7. Further, the presence server 100' has a buddy list 2a, a presence management table 2b, an allow list database (hereinafter abbreviated as DB) 8, a history table 9', a processing rule table 10 and an inquiry condition table 11 on the ROM and the hard disk. In order to facilitate the explanation, only what is different from the first embodiment will be explained.

(1) Inquiry Condition Table

FIG. 12 is a conceptual explanatory diagram of the inquiry condition table 11. The inquiry condition table 11 correlates a "presentity ID" and "the number of times before a collective notification is made" and stores the information. When "the number of times before a collective notification is made" is "N", it means that an inquiry is transmitted to a presentity every N times a status update command is received with respect to that presentity.

For example, "Default" is set for presentity "User 1". Therefore, an inquiry is transmitted to presentity "User 1" every time a status update command is received for this presentity for a predetermined number of times that the presence server 100' has set. Also for example, "5" is set for presentity "User 2" as the number of times before a collective notification is made. Therefore, an inquiry is transmitted to presentity "User 2" every five times that a status update commend is received for this presentity.

(2) History Table (2-1) Configuration of History Table

FIGS. 13A-13H are conceptual explanatory diagrams showing the history table 9' in the second embodiment. The history table 9' includes one extra record, i.e. an "inquiry completed" field in addition to the fields included in the history table 9 of the first embodiment. The "inquiry completed" field indicates whether or not an inquiry is made to a presentity as to whether or not its presence information should be updated by status information included in each entry.

For example, in an entry with operation ID "6" in the history table 9' in FIG. 13A, the "inquiry completed" field is "Yes" and the "allow update" field is "Yes". This indicates that in response to an inquiry regarding the update of presence information by status information of this entry, the update has been allowed.

Also for example, in an entry with operation ID "7" in the history table 9' in FIG. 13B, the "inquiry needed" field is "Yes" and the "setting completed" field is "No". This indicates that an inquiry regarding the update of presence information by status information of this entry is supposed to be made but has not been completed yet.

(2-2) Change in History Table and Inquiry Unit

Next, the function of the inquiry unit 6' and the change in the history table 9' will be explained. In order to facilitate the explanation, the inquiry condition table 11 is in the state shown in FIG. 12. Also, a case is taken where presentity is "User 2" and an inquiry is made to the presentity every five times that a status update command is received.

(i) FIG. 13A shows the history table 9' in a state at one point (hereinafter, "initial state"). In this example, the update of presence information of presentity "User 2" by publisher "Sensor 1" is allowed in response to an inquiry. It also shows that the "status" field of entry "6" is "setting" and this entry "6" is a current entry. In other words, latest presence information of presentity "User 2" will be based on status information of the current entry "6".

(ii) FIG. 13B shows the history table 9' after receiving a first status update command from publisher "Sensor 4". Entry "7" is newly added and this entry is a current entry. However, the "inquiry completed" field of entry "7" is "No". This means that an inquiry as to whether or not the update of presence information by publisher "Sensor 4" is to be performed has not been transmitted yet.

(iii) FIG. 13C shows the history table 9' after receiving a fourth status update command from publisher "Sensor 9". In the history table 9' in FIG. 13C, the "inquiry completed" field of the entries "7", "8", "9" and "10" that were newly added by the receipt of the first to fourth status update commands shows "No". A current entry is entry "10" that is most recently added. A value in the "previous update" field of entry "9" that has been registered as a third added entry is "Yes".

(iv) FIG. 13D is the history table 9' immediately after receiving a fifth status update command. With the receipt of the fifth status update command, entry "11" is added and becomes a current entry.

(v) FIG. 13E is the history table 9' immediately after an inquiry is transmitted. The inquiry unit 6' transmits an inquiry to presentity "User 2" every five times that presentity "User 2" receives a status update command. This figure shows a state of the history table 9' after the inquiry is transmitted. A value of the "inquiry completed" field for the five entries "7", "8", "9", "10" and "11" corresponding to the received status update commands is changed to "Yes". In other words, an inquiry as to whether or not the update of presence information by each publisher described in these entries is allowed is transmitted to presentity "User 2".

(vi) FIG. 13F is the history table 9' after a response is received in response to the inquiry. The inquiry unit 6' updates the history table 9' according to the response. This example shows a case where the update of presence information by publisher "Sensor 9" is allowed. The "allow setting" field is changed to "Yes" for entry "10" of publisher "Sensor 9". Entry "10" is also changed to a current entry. The other entries "7", "8", "9" and "11" are deleted because they were denied. Entry "6" in the initial state becomes unnecessary thus is deleted. Publisher "Sensor 9" by which the update is allowed is added to the allow list 8a by the inquiry unit 6'.

(vii) FIG. 13G shows the history table 9' after receiving another different response in response to the inquiry. The inquiry unit 6' updates the history table 9' in response to the response. This example shows a case where all the publishers that newly transmitted the status update commands were denied. In this case, only entry "6" that was registered in the initial state remains in the history table 9'. Also, the "status" field of entry "6" is changed to "setting" and entry "6" is set back to a current entry again. Publishers of entries "7", "8", "9", "10" and "11" that were the subject of the inquiry are registered in the deny list 8b by the inquiry unit 6'.

(viii) FIG. 13H shows the history table 9' after receiving yet another different response in response to the inquiry. The inquiry unit 6' updates the history table 9' in response to the response. This example shows a case where the update of presence information by publisher "Sensor 7" was allowed, the update by publisher "Sensor 11" neither allowed nor denied, and the other publishers denied. The "allow update" field for entry "9" of publisher "Sensor 7" is changed to "Yes". Also, entry "9" is set back to a current entry again. The "allow update" field for entry "11" of publisher "Sensor 11" is changed to "No". The "status" field of entry "11" is set to "keeping". The denied entries "7", "8", and "10" are deleted from the history table 9'. Entry "6" in the initial state became unnecessary thus is deleted, too. Publisher "Sensor 7" by which the update is allowed is added in the allow list 8a by the inquiry unit 6'. Publishers "Sensor 4", "Sensor 6", "Sensor 7" and "Sensor 9" by which the update was denied are added in the deny list 8b by the inquiry unit 6'. Publisher "Sensor 11" that was neither allowed nor denied is added neither in the allow list 8a nor in the deny list 8b.

<<Processing>>

(1) Main Routine

Figure 14A:
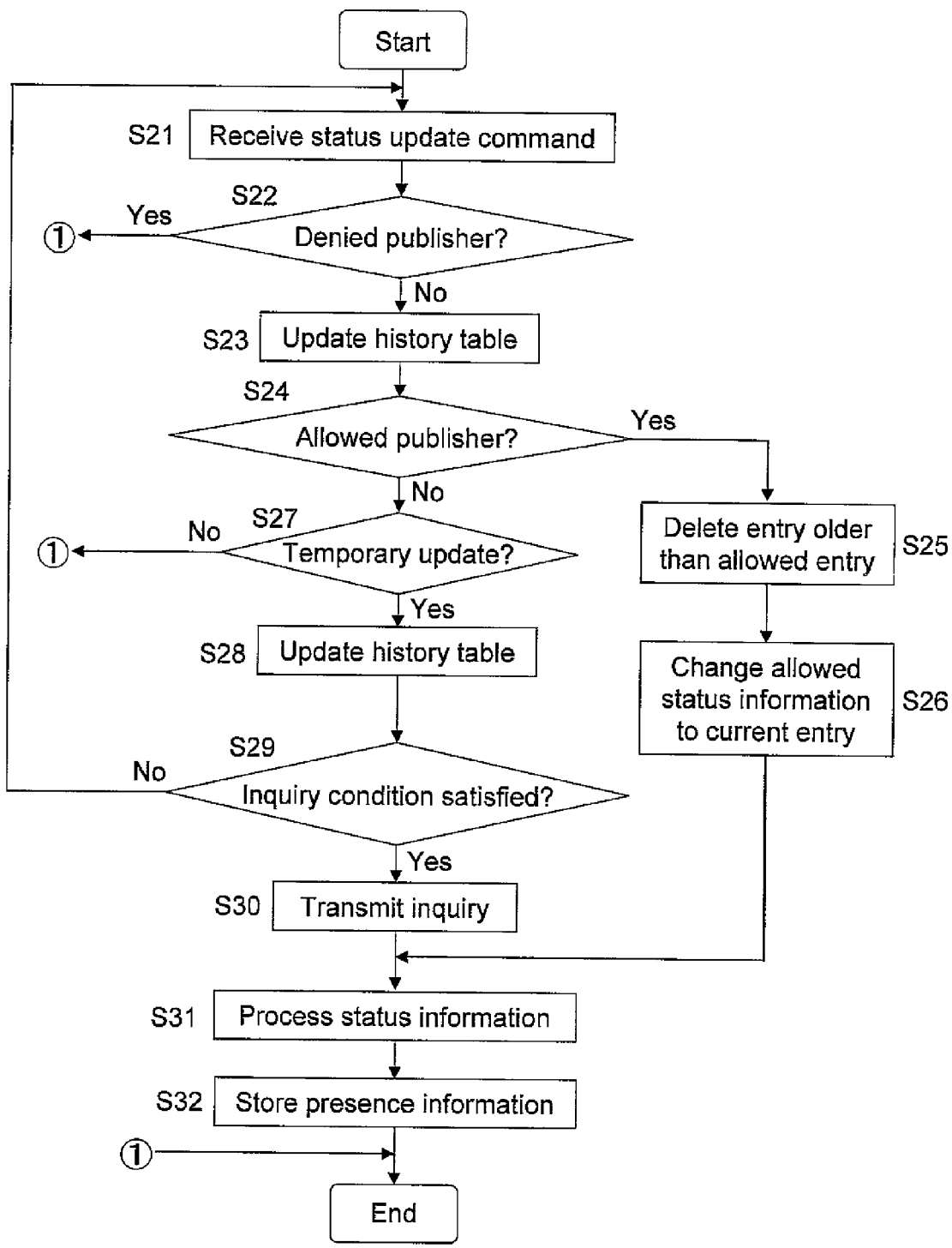
FIG. 14A is a flow chart showing one example of a main routine carried out by the presence server of FIG. 11.

FIG. 14A is a flow chart showing one example of a main routine carried out by the presence server 100' of the present embodiment. As was the case for the first embodiment, in order to facilitate the explanation, only the update of presence information by a publisher will be explained, and the update of presence information by a presentity itself is omitted in this figure. Processes in Step S21-S28 are the same as the processes in Step S1-S8 of the first embodiment.

Step S21: The presence server 100' waits for the receipt of a status update command, and the presence server 100' proceeds to Step S22 when receiving it.

Step S22: The presence server 100' determines whether or not a publisher that has transmitted the status update command is already denied by a presentity described therein by referring to the deny list 8b. If the publisher is already denied by the presentity, the presence server 100' ends the process.

Step S23: The presence server 100 then stores the received status information in the history table 9'.

Step S24: The presence server 100' determines whether or not the publisher that has transmitted the status update command is already allowed by the presentity. This determination is made based on whether or not a publisher ID of the publisher and a presentity ID of the presentity to which the presence information is set are correlated and stored in the allow list 8a. If the publisher is already allowed, the presence server 100' proceeds to Step S25. If the publisher is not allowed, the presence server 100' proceeds to Step S27 which will be discussed later.

Step S25-S26: The presence server 100' deletes from the history table 9' any entry that is older than an entry that includes the status information from the current allowed publisher (S25). The presence server 100' sets the entry that includes the status information from the current allowed publisher as a current entry (S26).

Step S27: The presence server 100' determines whether or not the temporary update is to be performed, for example, by referring to publishers that presentities have allowed or denied. When it is determined that the temporary update is not to be performed, the presence server 100' ends the process. When the temporary update is to be performed, the presence server 100' proceeds to Step S28.

Step S28: The presence server 100' changes the entry of the status information stored in the history table 9' to a current entry. In other words, a value of the "status" field for the new entry is changed to "setting". Also, a value of the "status" field for the entry that had previously been a current entry is changed to "keeping", and a value of the "previous update" field therefore is changed to "Yes" (see FIGS. 13B, 13C and 13D).

Step S29: The presence server 100' determines by referring to the history table 9' whether or not an inquiry condition for the presentity in the status update command received in the Step S21 is satisfied. If the inquiry condition is satisfied, the presence server 100' proceeds to Step S30. Taking the aforementioned presentity "User 2" as an example, the inquiry condition is satisfied when a status update command is received five times. If the inquiry condition is not satisfied, the presence server 100' returns to Step S21 and waits for the next status update command.

Step S30: The presence server 100' transmits an inquiry as to whether or not the update of presence information by the publisher is allowed to the presentity.

Step S31-S32: When the status information is received from the unrecognized publisher (S24 and S27-S28), the presence server 100' generates presence information from the status information based on the rule for unrecognized publisher (S31). The generated presence information is correlated with the presentity ID and stored in the presence management table 2b (S32). If the publisher is denied by the presentity, this presence information might be set back to the value of the previous presence information. The presence server 100' further transmits the new presence information as a change notification to the watcher.

When the status information is received from the publisher that is already allowed (S25-S26), the presence server 100' generates presence information from the status information based on the rule for allowed publisher (S31). The generated presence information is correlated with the presentity ID and stored in the presence management table 2b (S32). Further, the presence server 100' transmits a presence notify command that notifies the new presence information to the watcher.

(2) Response Process

Figure 14B:
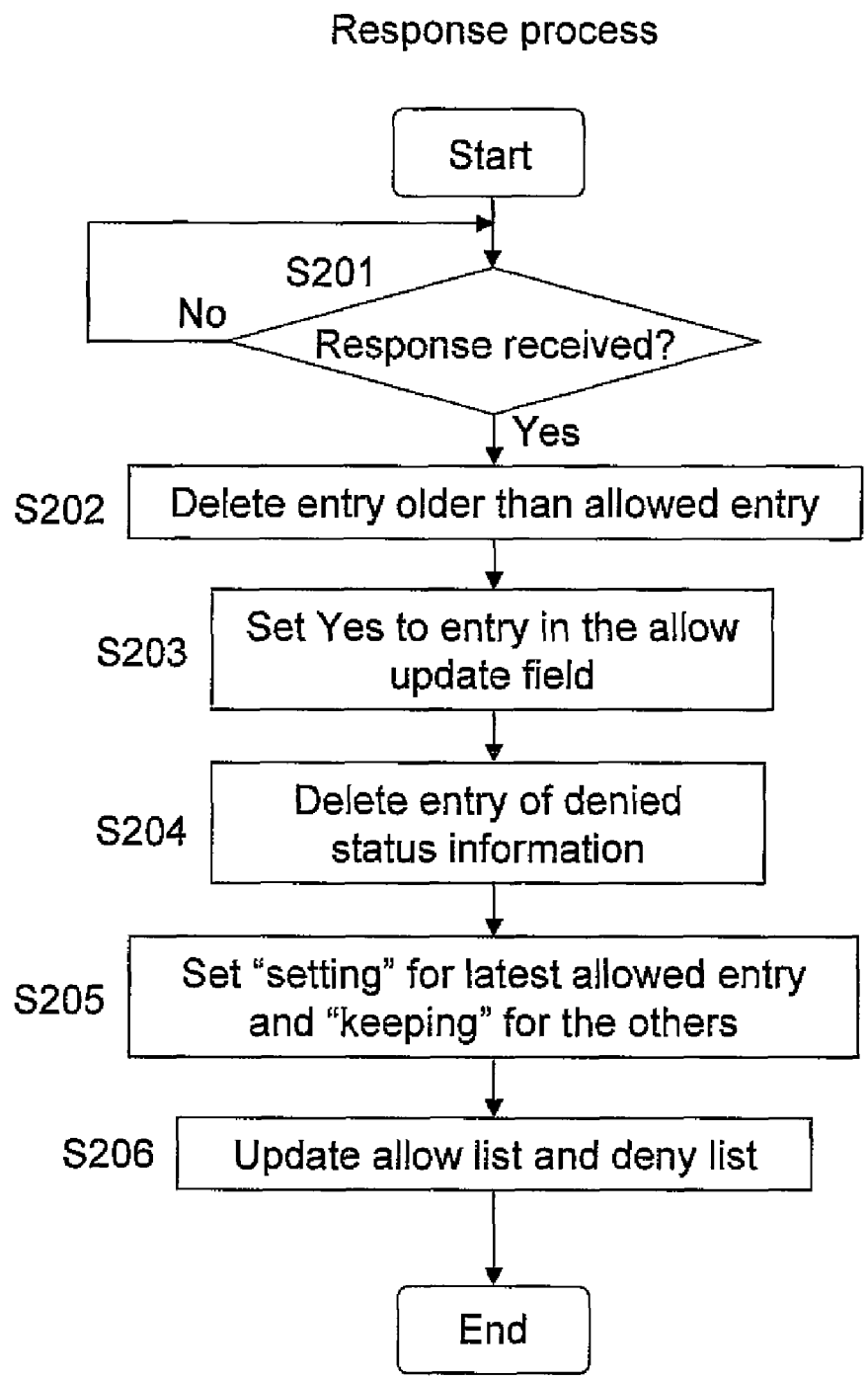
FIG. 14B is a flow chart showing one example of a response process carried out by the presence server of FIG. 11.

FIG. 14B is a flow chart showing one example of a response process carried out by the presence server 100' in response to a response by a presentity.

Step S201: The presence server 100' waits for a response from the presentity and the presence server 100 proceeds to Step S202 if the response is received.

Step S202-S203: When there is an entry that includes status information from a publisher that the presentity has allowed, the presence server 100' deletes from the history table 9' any entry that is older than the allowed entry (S202). In addition, "Yes" is set in the "allow update" field of the allowed entry (S203).

Step S204: The presence server 100' deletes from the history table 9' an entry that includes status information from a publisher that the presentity has denied.

Step S205: The presence server 100' sets "setting" in the "status" field of the latest allowed entry among the entries remaining in the history table 9' and sets this entry as a current entry. "Keeping" is set for the "status" field of the other entries. The presence server 100' also generates presence information based on the status information of the current entry and stores it in the presence management table 7b.

Step S206: The presence server 100' updates the allow list 8a and the deny list 8b in the allow list DB 8 in accordance with the response.

With the aforementioned processes, a presentity is able to collectively allow or deny status update commands from a plurality of publishers that the presentity does not recognize in one configuration. Therefore, the burden on a presentity is advantageously reduced in this way compared to the case where the configuration is set every time a status update command is received. The load on the network is also reduced because inquiries from the presence server 100' become less frequent.

Other Embodiments (A) In the first and second embodiment, an inquiry is transmitted to a presentity as to whether or not the update of presence information by a publisher is allowed.

However, an inquiry does not necessarily have to be transmitted. For example, it is possible to accept the information as to allow/deny at an arbitrary timing from a presentity. In this case, the inquiry unit 6 transmits the information for screen shot shown in FIG. 9 as an example to the presentity in response to a request from the presentity. On the configuration screen, a publisher ID that is included in the entry whose "inquiry needed" field is "No" in the history table 9 is displayed. The configuration screen accepts the configuration for a processing content and a time condition for each publisher ID.

(B) The present invention includes a computer program for causing a computer to execute the above method, and a computer readable recording medium on which such a program is recorded Examples of a computer readable recording medium include flexible disk, hard disk, CD-ROM, MO, DVD-ROM, DVD-RAM, BD (Blu-ray Disc), and semiconductor memory.

The computer program is not limited to a program recorded on the recording medium, and may also include programs transmitted across telecommunication lines, wireless or wired communication lines, or the Internet and other networks.

The present invention is widely applicable to a status management system.

While only selected embodiments have been chosen to illustrate the present invention, it will be apparent to those skilled in the art from this disclosure that various changes and modifications can be made herein without departing from the scope of the invention defined in depended claims. Furthermore, the detailed descriptions of the embodiments according to the present invention provided for illustration only, and not for the purpose of limiting the invention as defined by the present claims and specifications.

What is claimed is:

1. A status management device that is connected to a plurality of clients via a network and transmits status information of each client to a subscribing client that is subscribing to the status information of each client, comprising:

a presence storing unit that stores for each client latest presence information of each client;

a history storing unit that stores for each client history information that includes status information of each client;

a history update unit that receives status information of a subject client that is a given client from an updating client that is a client different from the subject client and that adds the status information to the history information;

a status notification unit that, in response to receiving the status information, transmits a status change notification that notifies that there has been a change in status information of the subject client to a subscribing client that is subscribing to status information of the subject client;

a configuration accepting unit that, after the status change notification is transmitted, accepts a configuration to allow or to deny an update of presence information by the updating client from the subject client and that stores the accepted configuration; and an update unit that generates new presence information based on the status information received from the updating client when a configuration to allow the update is accepted, and that updates by storing correlatively with the subject client the new presence information generated in the presence storing unit, wherein when the configuration accepting unit accepts the configuration to deny an update of presence information by the updating client, the configuration accepting unit deletes from the history information the status information from the updating client.

2. The status management device according to claim 1, further comprising an allow list storing unit that correlates recognized clients that are clients that have been either allowed or denied to update the presence information stored in the presence storing unit with each client and for storing the same;
  wherein the status notification unit determines whether or not the updating client is included in the recognized clients and transmits the change notification when not included.

3. The status management device according to claim 2, further comprising a buddy list storing unit that correlates a subscribed client whose presence information is subscribed by a subscribing client with each subscribing client and for storing the same;
  wherein the status notification unit compares a recognized client of a subscribed client whose presence information is subscribed by the subject client and the updating client and transmits the change notification based on the comparison result.

4. The status management device according to claim 2, further comprising:
  a buddy list storing unit that correlates a subscribed client whose presence information is subscribed by a subscribing client with each subscribing client and for storing the same; and
  an inquiry unit that transmits an inquiry whether or not to allow an update of presence information by the updating client to the subject client;
  wherein the inquiry unit compares a recognized client of a subscribed client whose presence information is subscribed by the subject client and the updating client and for transmitting the inquiry based on the comparison result.

5. The status management device according to claim 2, wherein when the configuration accepting unit accepts a configuration to allow or to deny an update of presence information by the updating client, the configuration accepting unit correlates the updating client, the subject client and the configuration to allow the update or to deny the update and store the same in the allow list storing unit.

6. The status management device according to claim 1, further comprising a processing rule storing unit that correlates a processing rule for processing status information received from the updating client with the subject client and for storing the same;
  wherein the status notification unit generates temporary information by processing the status information received from the updating client based on the processing rule, and transmits a status change notification that includes the temporary information.

7. The status management device according to claim 1, wherein when the configuration accepting unit accepts a configuration to allow an update of presence information by the updating client, the configuration accepting unit deletes from the history information status information that is older than the status information that is correlated with the subject client.

8. A status management method executed by a computer that is connected to a plurality of clients via a network and transmits presence information of each client to a subscribing client that is subscribing to the presence information of each client, the method comprising:
  a presence storing step of storing for each client latest presence information of each client;
  a history storing step of storing for each client history information that includes status information of each client;
  a history update step of receiving status information of a subject client that is a given client from an updating client that is a client different from the subject client and for adding the status information to the history information;
  a status notification step of, in response to receiving the status information, transmitting a change notification that notifies that there has been a change in status information of the subject client to a subscribing client that is subscribing to presence information of the subject client;
  a configuration accepting step of accepting a configuration to allow or to deny an update of presence information by the updating client from the subject client and for storing the accepted configuration after the change notification is transmitted;
  an update step of generating new presence information based on the status information received from the updating client when a configuration to allow the update is accepted, and updating the presence storing step by storing correlatively with the subject client the new presence information generated in the presence storing step; and
  deleting from the history information the status information from the updating client when the configuration accepting step accepts the configuration to deny an update of presence information by the updating client.

9. A non-transitory computer readable recording medium on which is recorded a status management program executed by a computer that is connected to a plurality of clients via a network and transmits presence information of each client to a subscribing client that is subscribing to the presence information of each client, wherein the program causes the computer to perform the following steps:
  storing for each client latest presence information of each client in a presence storing unit;
  storing for each client history information that includes status information of each client;
  receiving status information of a subject client that is a given client from an updating client that is a client different from the subject client and for adding the status information to the history information;
  transmitting, in response to receiving the status information, a change notification that notifies that there has been a change in status information of the subject client to a subscribing client that is subscribing to presence information of the subject client;
  accepting a configuration to allow or to deny an update of presence information by the updating client from the subject client and for storing the accepted configuration after the change notification is transmitted;
  generating new presence information based on the status information received from the updating client when the configuration to allow the update is accepted, and updating the presence storing unit by storing correlatively with the subject client the new presence information generated in the presence storing unit; and
  deleting from the history information the status information from the updating client when the configuration to deny the update of presence information by the updating client is accepted.

* * * * *